United States Patent
Cartwright (10) Patent No.: US 6,953,315 B2
(45) Date of Patent: Oct. 11, 2005

(54) APPARATUS AND METHOD FOR CONTROLLING FLOW OF PROCESS MATERIALS

(75) Inventor: Gary Dean Cartwright, Apex, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/759,349

(22) Filed: Jan. 16, 2004

(65) Prior Publication Data

US 2004/0161308 A1 Aug. 19, 2004

Related U.S. Application Data

(60) Provisional application No. 60/440,474, filed on Jan. 16, 2003.

(51) Int. Cl.[7] .................................................. B65G 1/00
(52) U.S. Cl. ......................... 414/217; 406/74; 406/84; 406/85; 406/192
(58) Field of Search .............................. 406/74, 84, 85, 406/192; 414/217; 222/334

(56) References Cited

U.S. PATENT DOCUMENTS

| | | |
|---|---|---|
| 2,946,488 A | 7/1960 | Kraft |
| 4,521,165 A | 6/1985 | Handleman |
| 5,622,484 A | 4/1997 | Taylor-McCune et al. |
| 6,210,533 B1 * | 4/2001 | Doelle .......................... 162/246 |
| 6,478,513 B1 | 11/2002 | Higuchi et al. |

OTHER PUBLICATIONS

International Search Report and Notification of Transmittal with Written Opinion, dated Apr. 15, 2005.

* cited by examiner

*Primary Examiner*—Joe Dillon, Jr.
(74) *Attorney, Agent, or Firm*—Jenkins, Wilson & Taylor, P.A.

(57) ABSTRACT

An apparatus and method for controlling the flow of a process material from a higher pressure environment to a lower pressure environment is provided. Each of a first and second chamber is divided into a product region and a control region by a flexible boundary. Inlet and outlet flow control devices provide fluid communication between each product region and a material input line and a material output line, respectively. A chamber control device is arranged to provide fluid communication between the control region of each chamber, which is filled with a non-compressible fluid. As product fills the product region of one chamber, fluid is displaced from the corresponding control region and into the control region of the other chamber. As the control region of the other chamber expands, product is forced out of the corresponding product region and into the material output line. The product region of each chamber is alternately filled and emptied to produce a continuous transport of material.

7 Claims, 7 Drawing Sheets

APPARATUS AND METHOD FOR CONTROLLING FLOW OF PROCESS MATERIALS

RELATED APPLICATIONS

This application claims the benefit of U.S. Provisional Patent Application Ser. No. 60/440,474, filed Jan. 16, 2003, the disclosure of which is incorporated herein by reference in its entirety.

TECHNICAL FIELD

The present invention relates to material processing equipment. More particularly, the present invention relates to transferring particulate-containing material from a higher pressure environment to a lower pressure environment without significantly damaging the material.

BACKGROUND ART

The processing of many food and beverage products requires subjecting the product to high temperatures for a period of time, thereby sterilizing the product. Traditional techniques, such as canning, expose the product to high temperatures for extended periods of time. Canning not only has a high energy cost, but also subjects the product to thermal stress, which frequently has a negative impact on the flavor and texture of the product.

More recent techniques involve aseptic processing, in which liquid foods and beverages are sterilized outside the package using an ultra-high temperature process that rapidly heats, and then cools, the product before packaging. The processing equipment allows the time (generally 3 to 30 seconds) and temperature (195° to 300° F.) to be tailored to place the least amount of thermal stress on the product, while ensuring safety. The rapid heating and cooling aspects of the aseptic process substantially reduce the energy use and nutrient loss associated with conventional techniques. As a result, aseptically packaged products retain more nutritional value and exhibit more natural texture, color, and taste.

The rapid heating and cooling steps of the aseptic process typically take place while the product is being piped from one vessel to another. A portion of the pipe is heated and, as the product passes through the heated portion of the pipe, heat is transferred to the product. The product within the pipe is under pressure, typically 50 to 100 psi, which serves to move the product through the pipe and also prevent vaporization of the water component of the product within superheated sections. Subsequent operations, such as packaging, normally require lower pressures, typically up to 15 psi. Thus, the product must go though a pressure reduction step before packaging.

Many designs of back-pressure or pressure reduction valves exist for single-phase fluids. However, these valves cause significant shear damage to sensitive fluids and particulate-containing liquids. Moreover, the valves can become clogged with particulates, which can damage the valve and potentially cause a rupture.

Accordingly, there is a need to provide a pressure reduction valve that can be used to transfer a continuous flow of particulate-containing material from a higher pressure environment to a lower pressure condition without significant damage to the particulates contained in the material.

DISCLOSURE OF THE INVENTION

In accordance with the invention, an apparatus for controlling the flow of a process material is provided. The apparatus includes a first chamber and a second chamber. Each chamber has a rigid outer shell and is divided into a first and a second region by a flexible boundary. The second region of each chamber is filled with a non-compressible fluid. An inlet flow control device is arranged to provide fluid communication between a material input line and alternately the first region of the first chamber and the first region of the second chamber. An outlet flow control device is arranged to provide fluid communication between a material output line and alternately the first region of the second chamber and the first region of the first chamber. A chamber control device is arranged to provide fluid communication between the second region of the first chamber and the second region of the second chamber.

In accordance with another aspect of the present invention, a method for transferring a material from a high pressure environment to a low pressure environment is provided. The method includes arranging an input flow control device to provide a flow of material from a high pressure conduit into a first region of a first chamber and arranging an output flow control device to provide a flow of material from a first region of a second chamber into a low pressure conduit. The method also includes arranging a chamber control device between a second region of the first chamber and a second region of the second chamber, thereby providing fluid communication between the respective second regions of the first and second chambers. The first and second region of each chamber is separated by a flexible boundary. The method also includes controlling a flow of non-compressible fluid from the second region of the first chamber to the second region of the second chamber.

In accordance with another aspect of the invention, the method for transferring a material from a high pressure environment to a low pressure environment includes arranging, after a time, the input flow control device to provide a flow of material from the high pressure conduit into the first region of the second chamber, arranging the output flow control device to provide a flow of material from the first region of the first chamber into the low pressure conduit, and controlling the flow of non-compressible fluid from the second region of the second chamber to the second region of the first chamber.

In accordance with yet another aspect of the invention, a method for transferring a process material from a high pressure environment to a lower pressure environment is provided. The method includes opening an input flow control device arranged to provide a flow of material from a high pressure conduit into a first region of a chamber intended to be filled with process material and opening an output flow control device arranged to provide a flow of material from a first region of a chamber intended to be emptied of process material into a low pressure conduit. A chamber control device arranged to control the flow of non-compressible fluid between a second region of the chamber being filled with process material and a second region of the chamber being emptied of process material may be adjusted to regulate the rate at which process material flows into and out of the respective chambers. The first and second region of each chamber is separated by a flexible boundary. Based on predetermined conditions, the chamber to be emptied of process material may be switched with the chamber to be filled with process material by opening and closing the appropriate input and output flow control devices.

Accordingly, the present invention provides a method and apparatus for transferring a continuous flow of particulate-containing material from a higher pressure environment to a lower pressure condition without significant damage to the particulate contained in the material.

Some of the objects of the invention having been stated hereinabove, and which are addressed in whole or in part by the present invention. Other objects will become evident as the description proceeds when taken in connection with the accompanying drawings as best described hereinbelow.

Figure 3A:
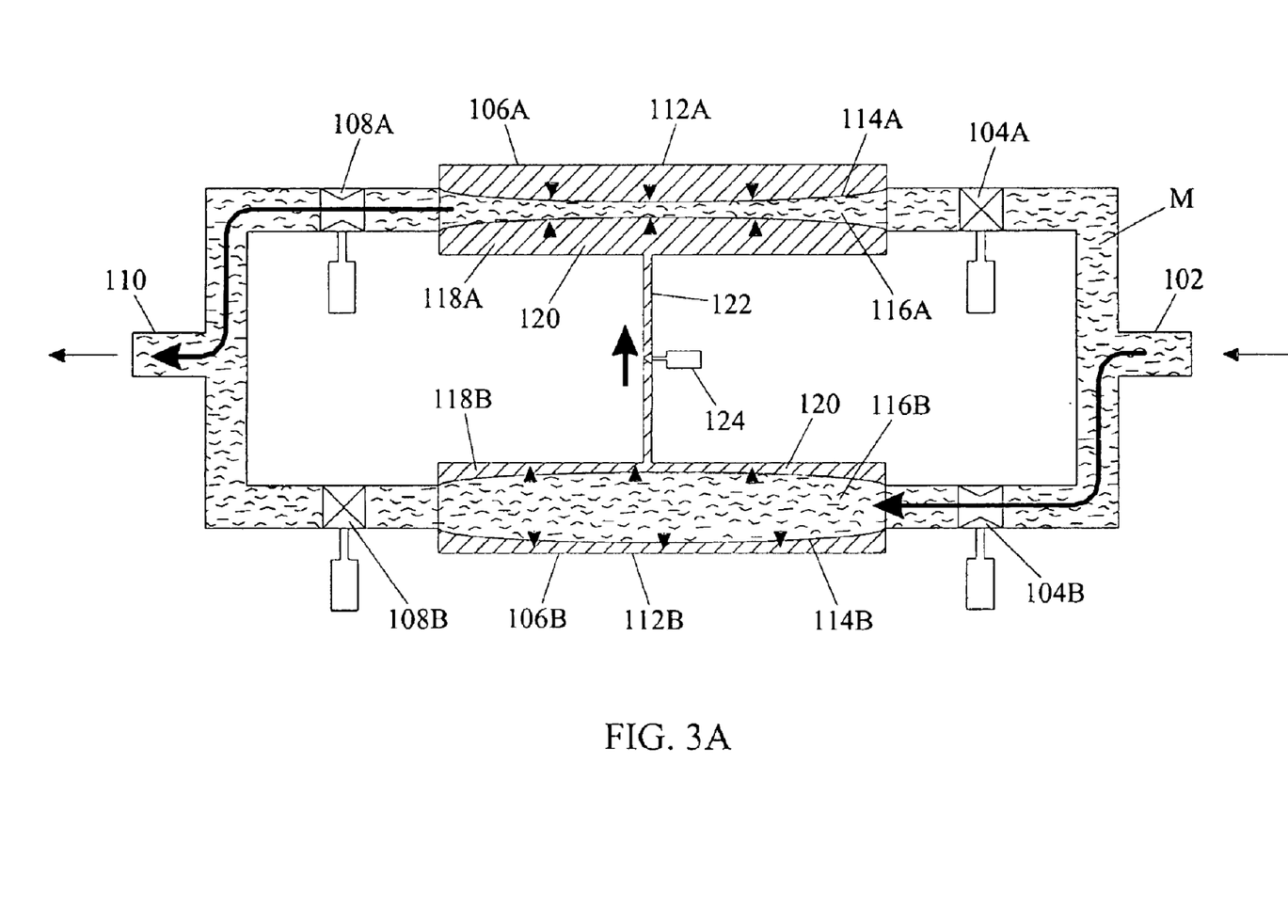

118B. Similarly, the volume of non-compressible fluid 120 that flows into outer lumen 118A displaces an equal volume of material M from inner lumen 116A. As noted above, the fluid 120 that is displaced from the outer lumen 118B of chamber 106B flows through the tube 122 and into the outer lumen 118A of chamber 106A. The rate at which fluid 120 flows from outer lumen 118B to outer lumen 118A determines how quickly material M can flow into the inner lumen 116B and out of inner lumen 116A, respectively. The control flow valve 124 regulates the flow of the non-compressible fluid 120 through the tube 122 and, as a result, the rate at which material M flows into and out of the respective chambers.

Figure 3B:
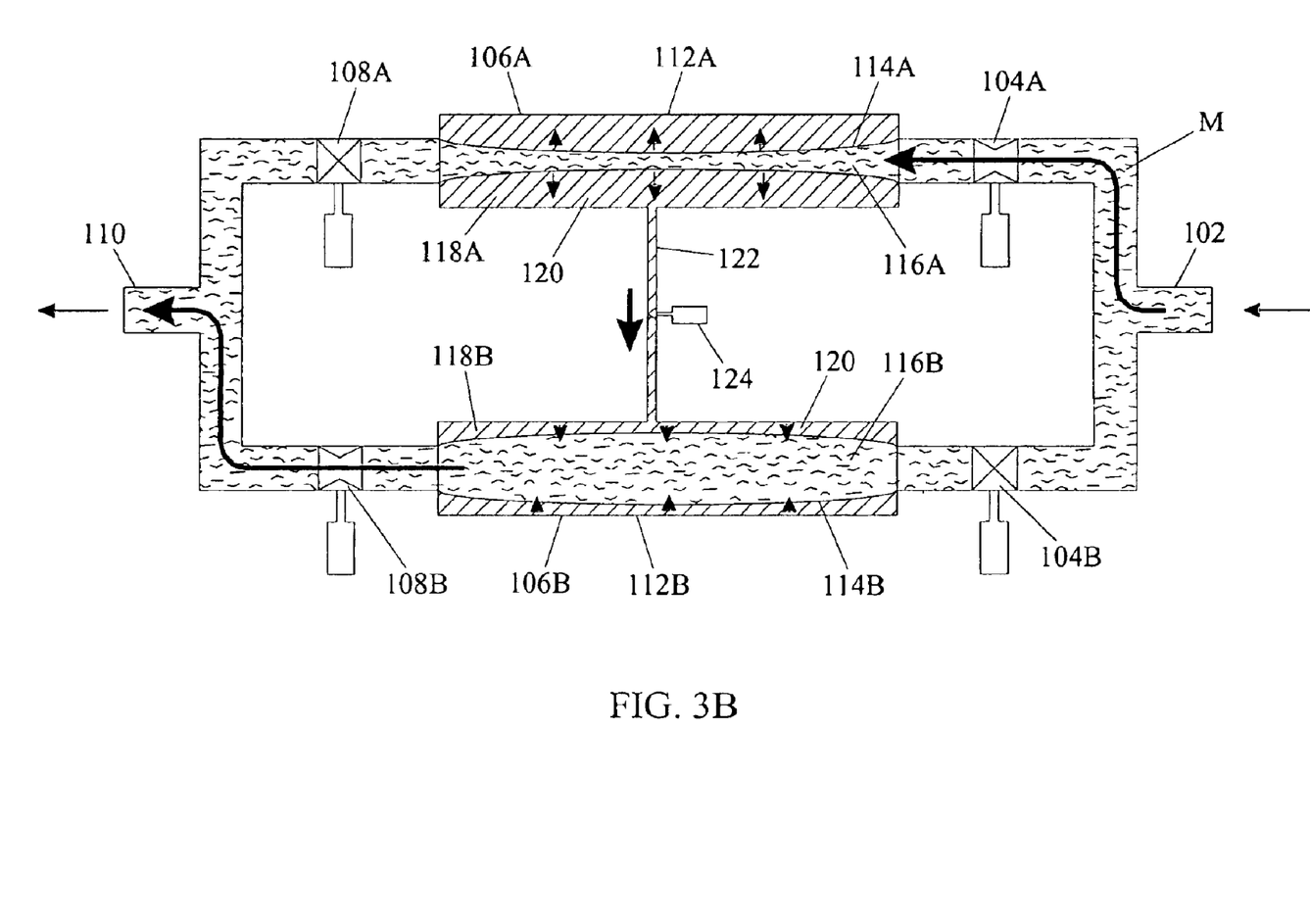

In FIG. 3B, inlet valve 104B is closed and inlet valve 104A is open, which permits particulate-containing material M to flow into the inner lumen 116A of chamber 106A. Since outlet valve 108A is closed, the material M collects in inner lumen 116A and causes the walls of the flexible conduit 114A to expand toward the outer wall 112A of chamber 106A. The expansion of the flexible conduit 114A displaces non-compressible fluid 120 in the outer lumen 118A. The displaced fluid 120 flows through tube 122 and into outer lumen 118B of chamber 106B.

As the volume of non-compressible fluid 120 in outer lumen 118B increases, the walls of flexible conduit 114B are forced inward, reducing the volume of inner lumen 116B. Since outlet valve 108B is open, the contracting walls of flexible conduit 114B push material M out of the inner lumen 116B, through outlet valve 108B, and into the low pressure conduit 110.

By alternately opening and closing the inlet and outlet valves as shown in FIGS. 3A and 3B, device 100 transfers material M from a high pressure environment to a lower pressure environment. The inner lumen of each chamber is alternately filled with then emptied of the particulate-containing material. As the lumen of one flexible conduit fills, the surrounding non-compressible fluid flows through the connecting tube and flow control valve into the outer lumen of the other chamber, forcing material out of the inner lumen at a flow rate determined by the flow-control valve. This system allows for the transfer of particulate containing material from a high-pressure environment to a lower pressure environment without significant mechanical damage to the particles. Moreover, the flow rate of the material is adjustable by controlling the rate at which the non-compressible fluid flows from one chamber to the other.

Figure 4:
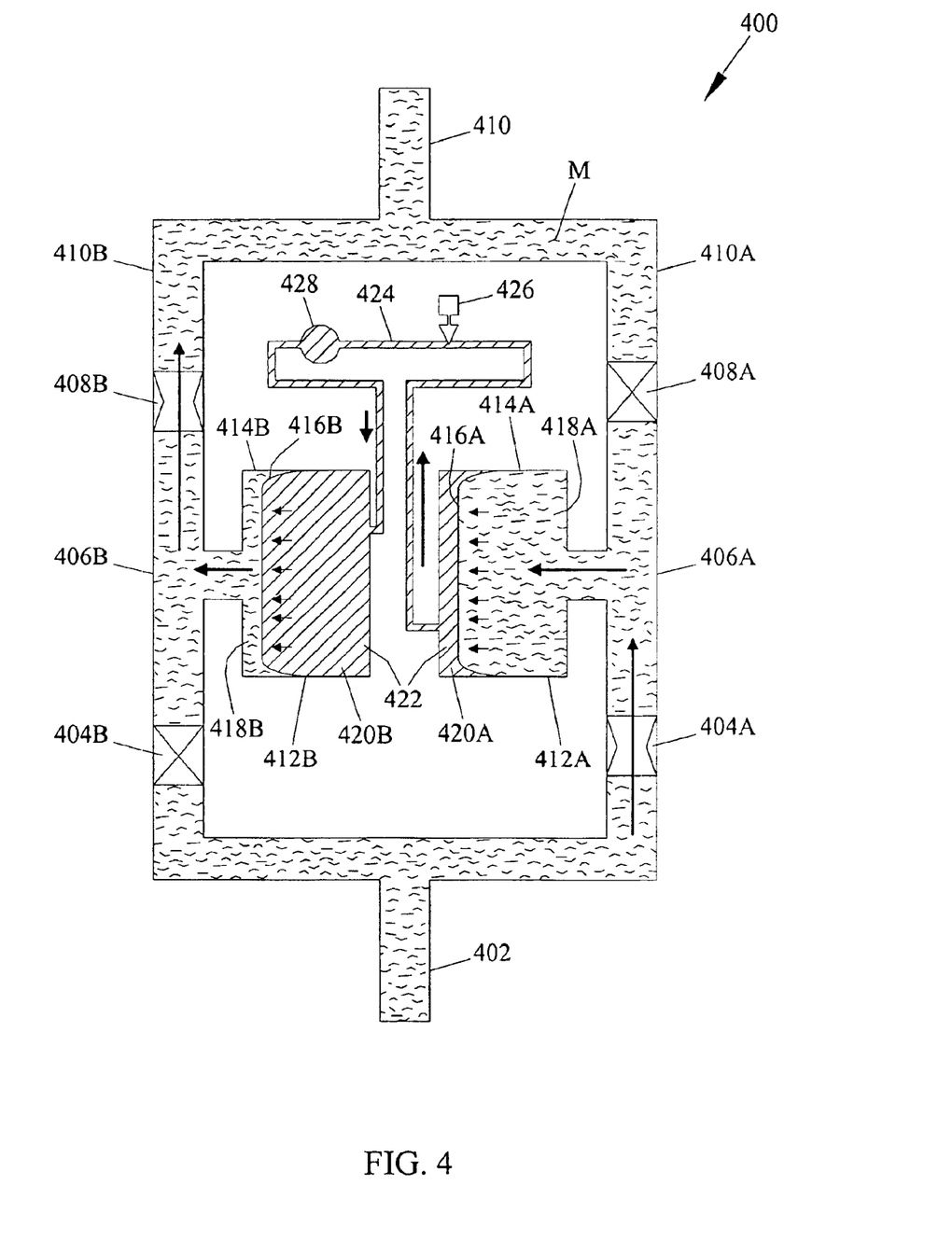

FIG. 4 is a schematic diagram of another embodiment of the device in accordance with the invention. Device 400 includes a high pressure conduit 402 having a proximal or first end and a distal or second end. The first end of the high pressure conduit 402 may be attached to a reservoir or other source of particulate-containing material (not shown). The second end of the high pressure conduit 402 may be connect to the first end of two or more inlet valves 404A, 404B. Inlet valves 404A, 404B may be opened to permit the flow of material through the valve or closed to prevent the flow of material. In FIG. 4, inlet valve 404B is shown in the closed position and inlet valve 404A is shown in the open position. The second or distal end of each inlet valve 404A, 404B is connected to a first end of a respective one of transition conduits 406A, 406B. Transition conduits 406A, 406B each divide into two branches. One branch of each of the transition conduits 406A, 406B connects to the first end of a respective outlet valve 408A, 408B. Outlet valves 408A, 408B may be opened to permit the flow of material through the valve or closed to prevent the flow of material. In FIG. 4, outlet valve 408A is shown in the closed position and outlet valve 408B is shown in the open position. The second end of each of outlet valves 408A, 408B is connected to a respective one of the first ends 410A, 410B of a low pressure conduit 410. The second end of the low pressure conduit 410 may, in turn, be connected to low pressure equipment, such as a dispensing apparatus (not shown).

The other branch of each of the transition conduits 406A, 406B connects to a respective chamber 412A, 412B. Chambers 412A, 412B have a rigid outer wall 414A, 414B, respectively. Flexible diaphragms 416A, 416B divide each chamber 412A, 412B, respectively, into a first region 418A, 418B, respectively, and a second region 420A, 420B, respectively. The first regions 418A, 418B are in fluid communication with the lumens of the transition conduits 406A, 406B. The second regions 420A, 420B of chambers 412A, 412B are filled with a non-compressible fluid 422. A tube 424 connects the second region 420A of chamber 412A to the second region 420B of chamber 412B. The tube 424 has a control flow valve 426 that controls the flow rate of the non-compressible fluid 422 between the second regions 420A, 420B of the chambers 412A, 412B. If desired, the rate of flow of the non-compressible fluid 422 may be measured using a flow meter 428 or similar device.

Figure 1:
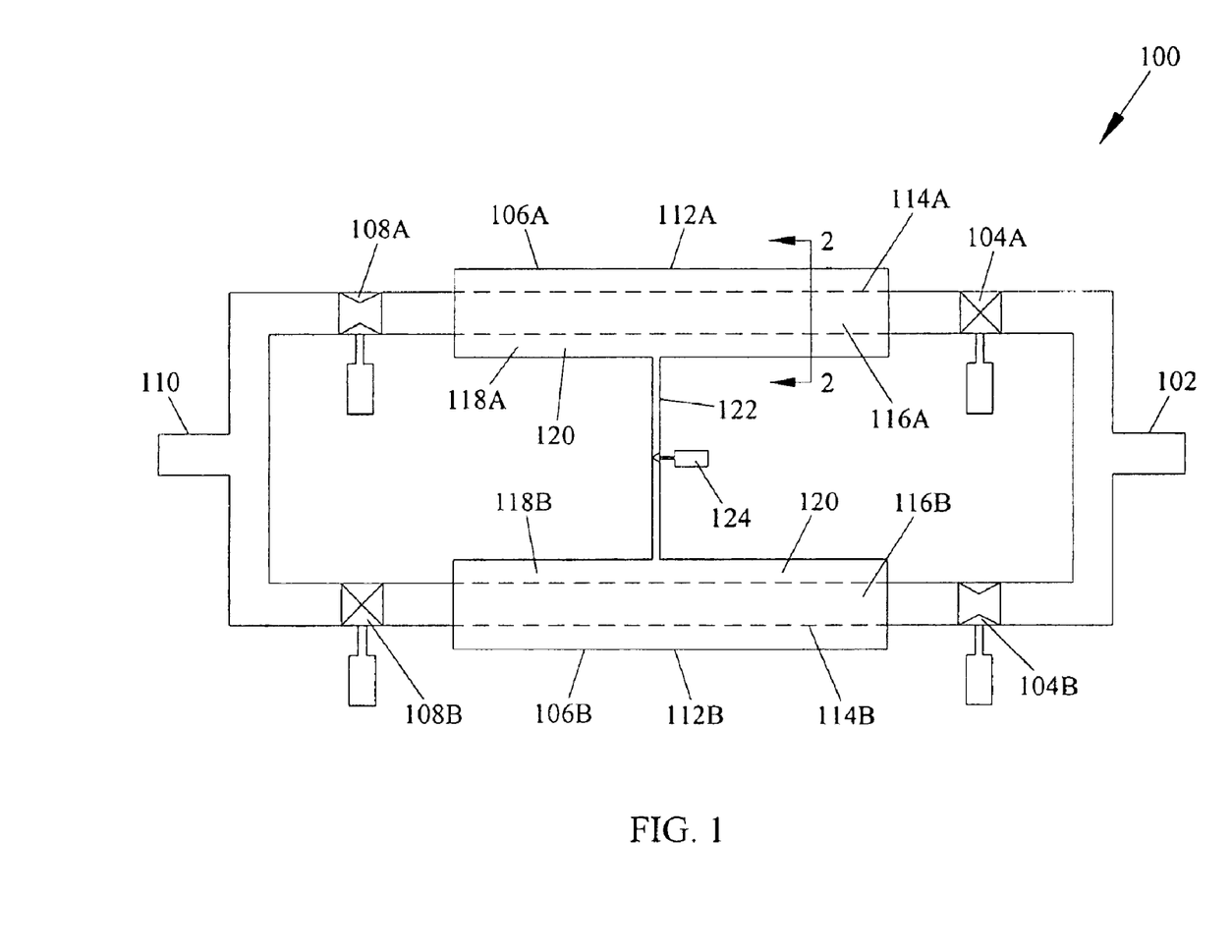
FIG. 1 is a schematic diagram of an embodiment of a device for transferring a continuous flow of particulate-containing material from a higher pressure environment to a lower pressure environment in accordance with the invention.
Figure 2:
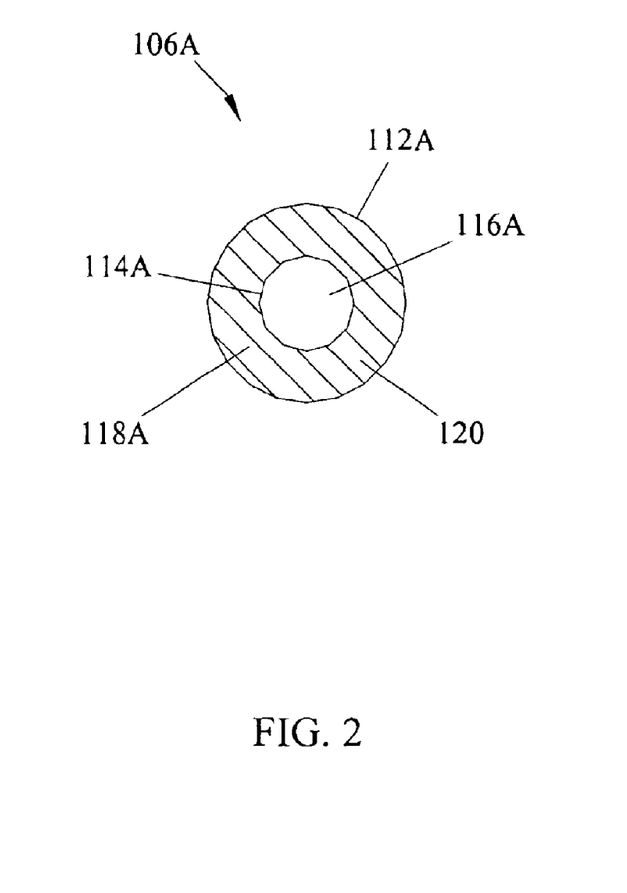
FIG. 2 is a vertical cross-sectional view of chamber 106A viewed along line 2—2 in FIG. 1.

The principle of operation of the device depicted in FIG. 4 is the same as that of the device depicted in FIGS. 1–3. Particulate-containing material M flows through the open inlet valve 404A and into the transition conduit 406A. Since the outlet port 408A is closed, the material M flows into the first region 418A of the chamber 412A. As the first region 418A of the chamber 412A fills with material M, the material M pushes against the flexible diaphragm 416A causing the first region 418A to expand and the second region 420A to contract. Non-compressible fluid 422 is displaced from the second region 420A of the chamber 412A into the tube 424. The fluid flows through the tube and into the second region 420B of chamber 412B. As the volume of fluid in the second chamber increases, the fluid pushes against the flexible diaphragm 416B, displacing material M from the first region 418B of the chamber 412B. The displaced material M flows into the transition conduit 406B. Since inlet valve 404B is closed and outlet valve 408B is open, the material M flows through the outlet valve 408B and into the low pressure conduit 410. Closing inlet valve 404A and outlet valve 408B, and opening inlet valve 404B and outlet valve 408A causes chamber 412B to fill with material M and chamber 412A to empty. As in the previous embodiment, the rate at which the chambers fill and empty can be controlled by adjusting the flow rate of the non-compressible fluid using the control flow valve 426.

The devices 100, 400 may be constructed using commercially available materials and conventional techniques. For example, conduits 102, 110, 402, 406, and 410 may be formed from a material capable of withstanding high temperatures and pressures, such as stainless steel. One skilled in the art would recognize that materials such as stainless steel are available in a variety of grades depending on the intended application. Accordingly, the specific grade of material should be matched to the intended application. For example, for food applications, a food-grade stainless steel may be selected.

Flexible conduits 114 and flexible diaphragms 416 may be formed from a flexible material that is suited to high temperatures and pressures, as well as compatible with the material being processed. Suitable materials may include rubber and fluoroelastomers, such as VITON® from DuPont Dow Elastomers, LLC.

Valves 104, 108, 404, and 408 may be an on/off pneumatic actuator diaphragm valve system, such as one of the ADVANTAGE® series of Pure-Flo® valves from ITT Industries. As noted above, valves 104, 108, 404, and 408 are either in the open or closed position. Fine adjustment of the aperture size of the valves is not presently needed during the normal operation of the device. Thus, a simple on/off actuator is adequate. Diaphragm-style valves are widely employed in food and pharmaceutical processing applications.

Flow control valves 124 and 426 may require finer adjustment of aperture size to reach the desired flow rate. As such, a conventional flow regulating valve may be used.

Figure 5:
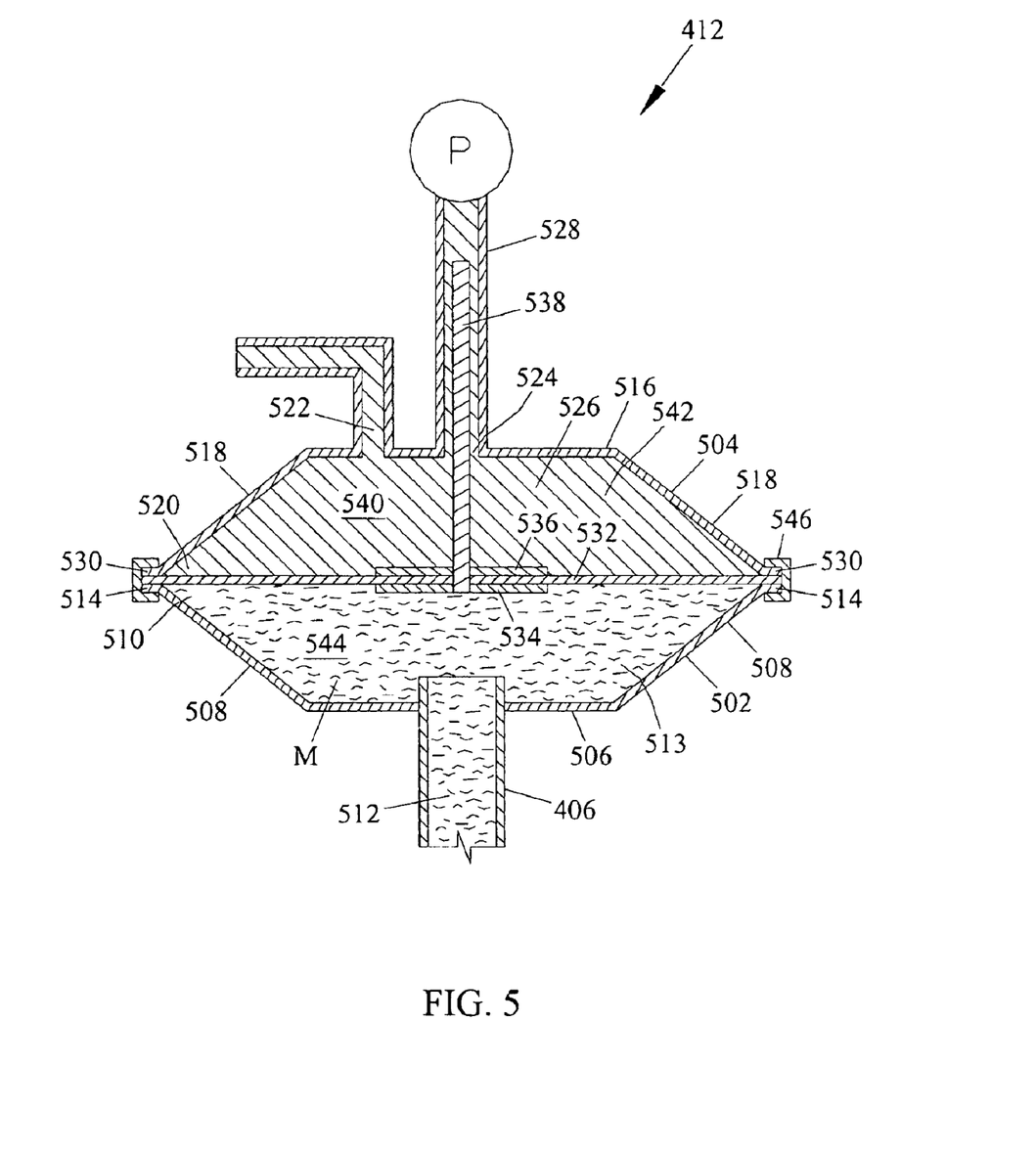

FIG. 5 is a sectioned view of an exemplary embodiment of chamber 412 in accordance with one aspect of the invention. The chamber 412 is formed from a concave base 502 and a concave lid 504. As shown in FIG. 5, the base has a substantially closed, flat bottom 506, angled sidewalls 508, and an open top 510. An aperture 512 extends through a portion of the bottom 506 of the base 502 and may attach to the transition conduit 406 such that the interior 513 of the base 502 is in fluid communication with the lumen of the transition conduit 406. A rim 514 is formed around the perimeter of the open top 510 of the base 502.

The lid 504 is of the same general size and shape as the base 502, but is oriented in the opposite direction. Thus, the lid has a substantially closed, flat top 516, angled sidewalls 518, and an open bottom 520. One or more apertures 522, 524 may extend through the top. One aperture 522 may provide fluid communication between the tube 424 and the interior 526 of the lid 504. A second aperture 524 may provide access to a guide shaft 528, the lumen of which is in fluid communication with the interior 526 of the lid 504. A rim 530 is formed around the perimeter of the open bottom 520 of the lid 504.

The chamber includes a flexible diaphragm 532, which is sandwiched between the respective rims 510, 530 of the base 504 and lid 502, and mechanically sealed, for example, using a clamp 546, to form two watertight vessels capable of being pressurized. Plates 534, 536 are positioned on each side of the diaphragm to provide support for a piston 538. The plates 534, 536 are substantially smaller in diameter than the diaphragm 532 and do not significantly interfere with the flexibility of the diaphragm 532. The piston 538 extends through the upper vessel 540 from the diaphragm 532 into the guide shaft 528. The upper vessel 540 is filled with a non-compressible fluid 422, such as water.

During the operation of the device 400, the diaphragm 532 moves between the upper 540 and lower 544 vessels as the respective vessels fill and empty. The movement of the diaphragm 532 results in a corresponding movement of the piston 538 in the guide shaft 528. As discussed below, it may be desirable to place sensors in or around the guide shaft to determine the position of the piston within the guide shaft. The guide shaft may also be fitted with a pressure gauge to monitor the interior pressure of the vessel.

Figure 6:
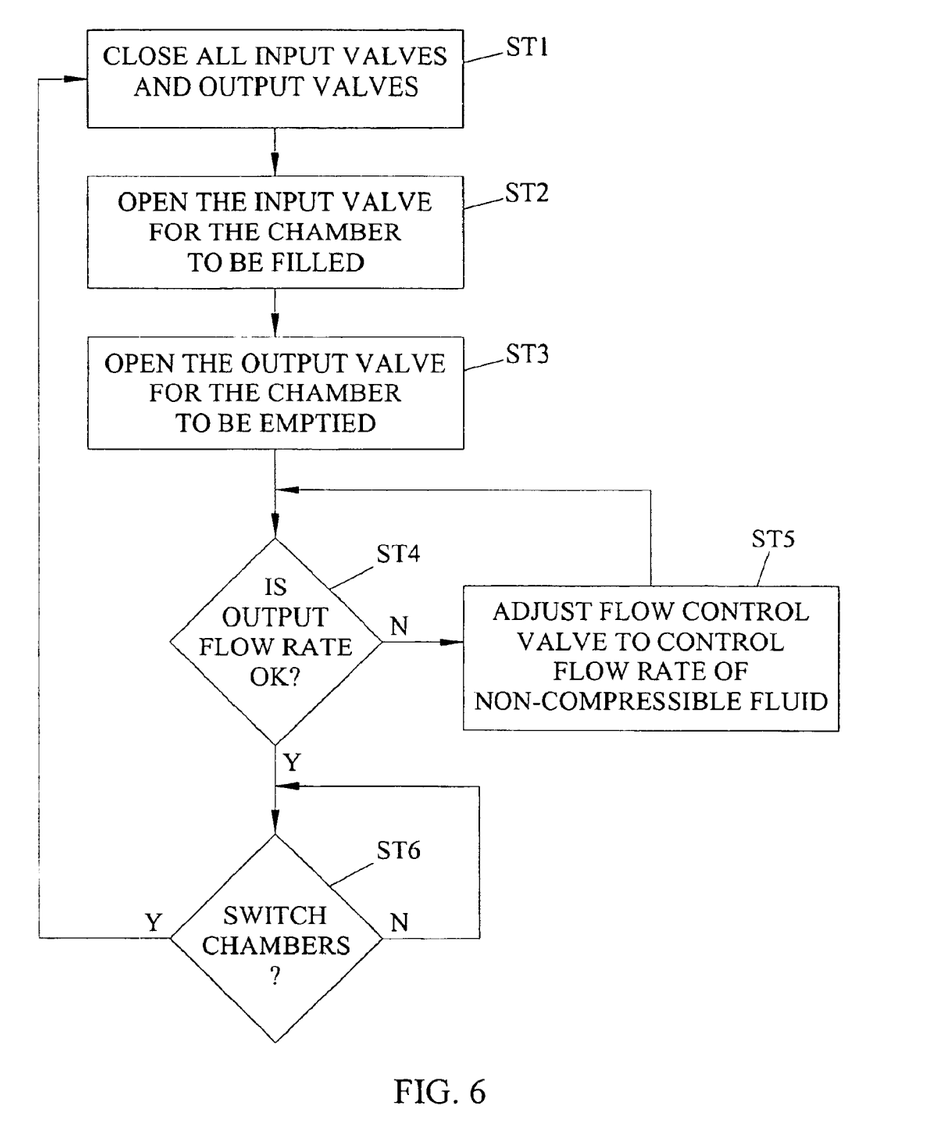

As noted above, devices 100, 400 transfer material M from a high pressure environment to a low pressure environment by opening and closing the inlet and outlet valves as shown, for example, in FIGS. 3A and 3B. FIG. 6 is a flow diagram of the steps that may be followed to operate devices 100, 400. In step ST1, all of the input and output valves may be closed. Although this step is optional, momentarily closing all of the input and output valves ensures that the input and output valves associated with the same chamber are not open at the same time. As noted above, opening the input and output valves associated with the same chamber would permit process material to flow unchecked from the high pressure conduit to the low pressure conduit, which is not desirable.

In steps ST2 and ST3, the input valve for the chamber to be filled with process material is opened and the output valve for the chamber to be emptied of process material is opened. The order of these steps is arbitrary, since the flow of process material will not occur until both an input valve and an output valve are opened. Thus, step ST3 may be performed prior to, simultaneously with, or after step ST2.

In step ST4, the output flow rate of the process material is checked. If the rate is too high or too low, the flow rate of the non-compressible fluid is adjusted using the flow control valve (step ST5). As noted above, the flow rate of the non-compressible fluid between the chambers controls how quickly one chamber fills and the other chamber empties.

In step ST6, a decision is made whether to switch chambers. If the decision is made to switch chambers, processing continues with step ST1. It should be appreciated that in each pass through the process loop shown in FIG. 6, the roles of the chambers is reversed. Thus, the chamber that was filled during one pass is emptied during the next and the chamber that was emptied during one pass is filled during the next. The decision to switch chambers may be done at a fixed interval of time or as the result of some other signal.

While the chambers may be switched at fixed intervals, this may result in sub-optimum performance of the device. For example, if the valves are closed before the chamber is completely filled or emptied of material then the device is not transferring as much material as possible with each cycle. Likewise, if there is a delay between the point when the chamber is completely full or completely empty and the valves are closed, the device is transferring the maximum amount of material in each cycle, but the cycle lasts longer than necessary. As noted above, the rate at which the material flows into and out of the chambers depends on the rate of flow of the non-compressible fluid between the chambers. However, the flow rate of the material also depends on other factors, such as the amount of pressure applied to the material in the high pressure conduit, the length and inner diameter of the high pressure conduit, and the viscosity of the material. Thus, changes in any of these factors may cause the device to perform at a sub-optimum level. By using one or more sensors in or around the chambers, the capacity of the chambers may be monitored and the timing of each cycle may be adjusted to achieve optimum performance of the device.

It will be understood that various details of the invention may be changed without departing from the scope of the invention. For example, other sensitive or viscous materials may be used in place of the particulate-containing material in the operation of the apparatus described herein. Such materials include sheer sensitive materials, including biological components, and materials having suspended slurry or crystalline components. Furthermore, the foregoing description is for the purpose of illustration only, and not for the purpose of limitation, as the invention is defined by the claims as set forth hereinafter.

What is claimed is:

1. An apparatus for controlling the flow of a process material, comprising:
    (a) a first chamber having a rigid outer shell, the first chamber being divided into first and second regions by a flexible boundary, the second region being filled with a non-compressible fluid;
    (b) a second chamber having a rigid outer shell, the second chamber being divided into first and second regions by a flexible boundary, the second region being filled with a high pressure non-compressible fluid;

(c) an inlet flow control device arranged to provide fluid communication between a material input line and alternately the first region of the first chamber and the first region of the second chamber;

(d) an outlet flow control device arranged to provide fluid communication between a material output line and alternately the first region of the second chamber and the first region of the first chamber; and (e) a chamber control device arranged to provide fluid communication between the second region of the first chamber and the second region of the second chamber;

(f) wherein the apparatus is such that it regulates the high pressure input line so as to alternately discharge process material from each of said first regions.

2. The apparatus according to claim 1, wherein each flexible boundary is generally annular, thereby forming a respective inner lumen, and coaxially disposed within its respective outer shell, thereby forming a respective outer lumen between the flexible boundary and the outer shell.

3. The apparatus according to claim 2, wherein the inner lumen includes the first region and the outer lumen includes the second region.

4. The apparatus according to claim 1, wherein the inlet flow control device includes at least two valves, one valve arranged between the material input line and the first region of the first chamber and another valve arranged between the material input line and the first region of the second chamber.

5. The apparatus according to claim 1, wherein the outlet flow control device includes at least two valves, one valve arranged between the material output line and the first region of the first chamber and another valve arranged between the material output line and the first region of the second chamber.

6. The apparatus according to claim 1, wherein the inlet flow control device and the outlet flow control device cooperate to ensure that each first region communicates with no more than one of the material input line and the material output line at a time.

7. The apparatus according to claim 1, wherein the chamber control device comprises:

(a) a conduit fluidly interposed between the first and second chambers; and (b) a flow control valve arranged to control the flow of non-compressible fluid between the second region of the first chamber and the second region of the second chamber.

* * * * *